US010213646B2

(12) United States Patent
Sandel et al.

(10) Patent No.: US 10,213,646 B2
(45) Date of Patent: Feb. 26, 2019

(54) SYSTEM FOR LOCATING A GOLF BALL

(71) Applicants: Thomas Sandel, Buchs (CH); Alex Raimondi, Hüntwangen (CH); Daniel Rauch, Egg (CH)

(72) Inventors: Thomas Sandel, Buchs (CH); Alex Raimondi, Hüntwangen (CH); Daniel Rauch, Egg (CH)

( * ) Notice: Subject to any disclaimer, the term of this patent is extended or adjusted under 35 U.S.C. 154(b) by 15 days.

(21) Appl. No.: 15/038,070

(22) PCT Filed: Nov. 20, 2014

(86) PCT No.: PCT/EP2014/075090
§ 371 (c)(1),
(2) Date: May 20, 2016

(87) PCT Pub. No.: WO2015/075108
PCT Pub. Date: May 28, 2015

(65) Prior Publication Data
US 2016/0296796 A1 Oct. 13, 2016

(30) Foreign Application Priority Data
Nov. 22, 2013 (CH) .................................. 01958/13

(51) Int. Cl.
A63B 69/36 (2006.01)
A63B 43/00 (2006.01)
(Continued)

(52) U.S. Cl.
CPC ...... *A63B 24/0021* (2013.01); *A63B 37/0003* (2013.01); *G01S 19/19* (2013.01);
(Continued)

(58) Field of Classification Search
CPC ............ A63B 24/0021; A63B 37/0003; A63B 37/0055; A63B 43/00; A63B 69/3658;
(Continued)

(56) References Cited

U.S. PATENT DOCUMENTS 6,908,404 B1  6/2005 Gard
7,095,312 B2  8/2006 Erario et al.
(Continued)

FOREIGN PATENT DOCUMENTS

WO  2005116944 A2  12/2005
WO  2011008082 A1  1/2011
WO  2015075108 A1  5/2015

OTHER PUBLICATIONS

International Search Report for PCT/EP2014/075090 dated Feb. 27, 2015.

*Primary Examiner* — Lawrence S Galka
(74) *Attorney, Agent, or Firm* — Brian Roffe

(57) ABSTRACT

Golf ball with an outer casing has an electronic device housed in a plastic core and includes at least one receiver, a microelectronic device for evaluating and forwarding the received signals and a transmitter and/or receiver. The transmitter or receiver can communicate with a separate electronic device worn by the user. The invention will enable a player to easily find and locate a ball that is not lying on the fairway that cannot be spotted or found with the naked eye.

20 Claims, 2 Drawing Sheets

(51) Int. Cl.
*A63B 24/00* (2006.01)
*G01S 19/19* (2010.01)
*G01S 19/34* (2010.01)
*A63B 37/00* (2006.01)
*G01S 19/09* (2010.01)
*G01S 19/36* (2010.01)
*G01S 5/00* (2006.01)

(52) U.S. Cl.
CPC ........... *G01S 19/34* (2013.01); *A63B 37/0074* (2013.01); *A63B 37/0075* (2013.01); *A63B 37/0076* (2013.01); *A63B 2024/0053* (2013.01); *A63B 2220/12* (2013.01); *A63B 2220/20* (2013.01); *A63B 2225/50* (2013.01); *G01S 5/0018* (2013.01); *G01S 19/09* (2013.01); *G01S 19/36* (2013.01)

(58) Field of Classification Search
CPC ................ A63B 71/06; A63B 71/0619; A63B 2024/0028; A63B 2024/0037; A63B 2024/0053; A63B 2102/32; A63B 2222/12; A63B 2222/20; A63B 2222/833; A63B 2225/15; A63B 2225/50; G01S 5/0027; G01S 19/05; G01S 19/19
See application file for complete search history.

(56) References Cited

U.S. PATENT DOCUMENTS

| | | | |
|---|---|---|---|
| 2002/0091017 A1 | 7/2002 | Kuesters | |
| 2005/0101411 A1* | 5/2005 | Stiller | A63B 24/0021 473/353 |
| 2005/0259002 A1* | 11/2005 | Erario | A63B 24/0021 342/357.61 |
| 2008/0058125 A1* | 3/2008 | Nguyen | A63B 57/00 473/407 |
| 2010/0009780 A1* | 1/2010 | Doherty | A63B 24/0021 473/407 |
| 2010/0151955 A1* | 6/2010 | Holden | A63B 24/0021 473/199 |
| 2011/0207553 A1* | 8/2011 | Reid | A63B 24/0021 473/353 |
| 2012/0115623 A1 | 5/2012 | van Driel | |
| 2013/0002489 A1* | 1/2013 | Erad | G01S 3/20 342/432 |
| 2013/0144411 A1* | 6/2013 | Savarese | G06F 17/40 700/91 |
| 2014/0128171 A1* | 5/2014 | Anderson | G01S 19/19 473/199 |

* cited by examiner

SYSTEM FOR LOCATING A GOLF BALL

FIELD OF THE INVENTION

The invention relates to a ball with an outer casing that has an electronic device housed in a plastic core and includes at least one receiver, a microelectronic device for evaluating and forwarding received signals and a transmitter that communicates with a separate electronic device to thereby enable a player to easily find and locate the ball.

BACKGROUND OF THE INVENTION

In particular when playing golf there are occasions when balls can no longer be found after being struck because they have landed away from the fairway in the uncut grass, in shrubbery, in a wooded area or elsewhere. Consequently, less experienced players in particular regularly lose balls and then require new ones, and so always have to ensure that they carry a sufficient number of balls with them on a round.

OBJECTS AND SUMMARY OF THE INVENTION

In view of this, the object of the present invention is to create balls, in particular for golf, which can be reliably located by a player even if the balls land in particular away from the fairway in uncut grass, in shrubbery, in a wooded area, in leaves or the like, and the user can no longer see them.

According to the invention, this object is achieved by a system for locating a ball including an outer casing defining the ball, a core inside the outer casing, an electronic device integrated into the core, and an energy source integrated into the core and which supplies power to the electronic device, the electronic device including at least one receiver that receives signals, microelectronics for evaluating and forwarding the signals received by the at least one receiver, and a communications unit that transmits signals. The system also includes a smartphone including an integrated navigation system including a display and configured to communicate with a global positioning system (GPS) and indicate its position on the display, a radio device configured for short-range wireless communication with the electronic device in the ball to enable the smartphone to receive, via the radio device, signals transmitted by the communications unit of the electronic device in the ball directly from the communications unit of the electronic device in the ball, a microprocessor that recognizes and evaluates the signals received by the radio device of to derive location data about the ball, the display displaying actual location of the ball based on the location data derived by the microprocessor, and a retrievable software program that when retrieved by the microprocessor, provides the location data about the ball to enable tracking and analysis of location and distances of the ball.

According to the invention, an electronic device consisting of microelectronics, a transmitter and a system for absolute and/or relative position determination is integrated into the plastic core of the ball. A GPS receiver and/or a direction-finding transmitter or the like can be used for this purpose. In combination with a separate electronic device carried by a user and which can communicate with the transmitter within the ball, this makes it possible to locate the position of the ball.

With this ball design according to the invention, a player is provided with totally new possibilities on the course because without any great difficulty he can precisely pinpoint and locate a ball that is away from the fairway and could no longer be seen and found with the naked eye, and which would consequently have been lost.

Further advantageous embodiments of this ball are defined within the framework of the invention in the dependent claims.

According to the invention, an electronic device can be brought into radio contact with the ball so that it can communicate with the latter in order to locate it. For this purpose a receiver and/or transmitter for communicating with the ball, a microprocessor for evaluating the received signals and a visual and/or acoustic display of the location of the ball is provided in the device.

Advantageously, a smartphone with an integrated navigation system, in particular GPS, and with a radio device, for example W-LAN is used for this device. Therefore, another advantage is offered in that the user does not require a separate electronic device because he already carries a smartphone with him.

BRIEF DESCRIPTION OF THE DRAWINGS

Exemplary embodiments of the invention and further advantages of the latter are described in more detail below by means of the drawings. These show as follows.

DETAILED DESCRIPTION OF THE INVENTION

Figure 1:
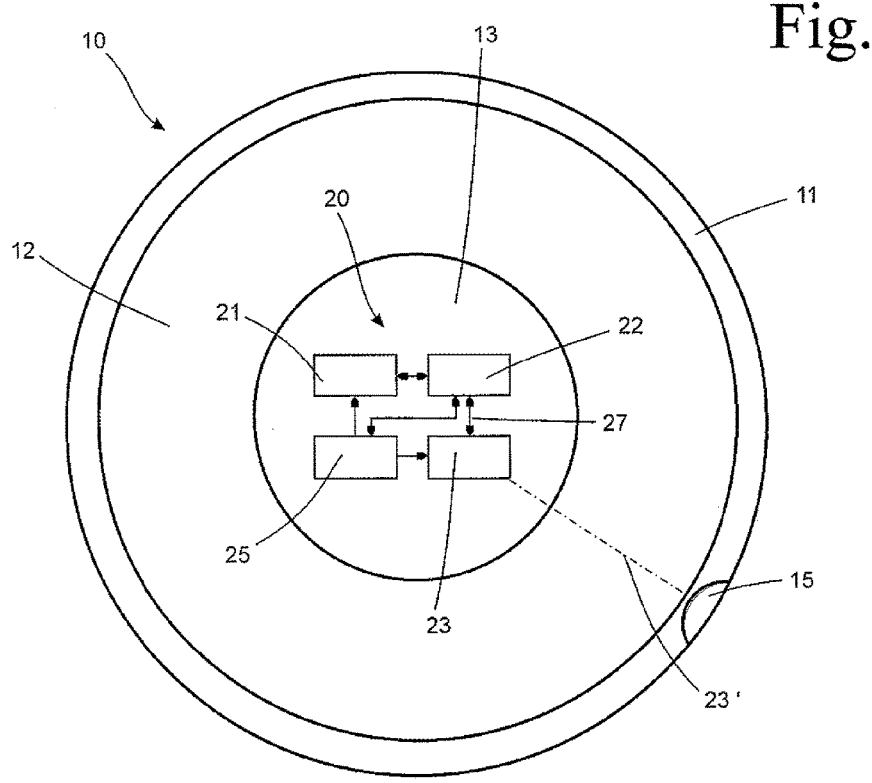
FIG. 1 is a diagrammatic section through a ball according to the invention.

FIG. 1 shows an enlarged illustration of the ball 10 with an outer casing 11 and a plastic core 12, 13 comprising a number of parts and which can be made of conventional materials. The ball could also be produced from a one-part plastic core.

In the present exemplary embodiment, the ball 10 is a golf ball. Needless to say, other balls which are used in other types of sport are also conceivable.

According to the invention, there is integrated into the plastic core 13 of the ball an electronic device 20 which comprises a GPS receiver 21, microelectronics 22 for evaluating and forwarding the received signals, and a transmitter 23 which can communicate with a separate electronic device 30 carried by a user and so with this, it is possible to locate the position of the ball 10. In addition, an energy source 25 which supplies power to the electronic device 20 integrated into the ball is integrated into the plastic core 13 of the ball.

The microelectronics 22 comprise all of the necessary electronic components which, if so required, amplify the GPS signals received by the receiver 21, evaluate the signals by means of a microprocessor and forwards the signals to the transmitter 23 via an interface. Simple software for the microelectronics 22 enable the program sequences within the ball.

The use of the energy source 25 is also controlled by these integrated microelectronics 22. The microelectronics can cause the electronic device 20 to switch on and switch off (sleep mode) by electronic means.

The electronic device 20 with the microelectronics 22, the receiver 21, the transmitter and/or receiver 23 and the energy source 25 are embedded within the plastic core 13 of the ball such that it remains functional over the normal life span of a ball. Advantageously, the microelectronics 22 are cast integrally as a chip or the antennas are cast integrally as boards so that they remain fixed within the ball, even when the ball is hit or when it is subjected to impact against the ground.

The receiver 21 and the transmitter and/or receiver 23 can respectively be provided with an antenna 23' which is integrated into the plastic core of the ball so that reliable reception and transmission of the signals is guaranteed. With the golf balls, so-called dimples 15 are arranged distributed around the outer circumference of the ball. One or a number of antennas 23' can be guided outwardly into a dimple 15, by means of which the required signal transmission energy or quality is improved.

Figure 2:
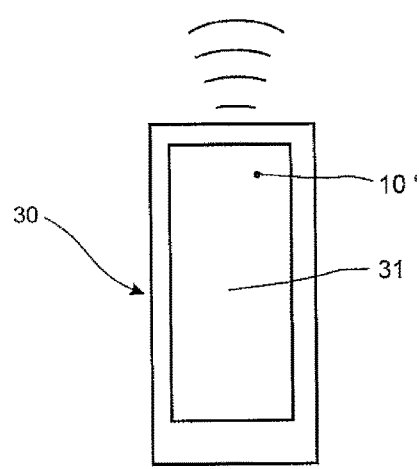
FIG. 2 is a diagrammatic view of an electronic device for communication with the ball.

In the electronic device 30 according to FIG. 2, according to the invention, a receiver for receiving signals transmitted by the ball 10, a microprocessor for evaluating the received signals and a visual and/or acoustic display 31 showing the location of the ball 10' are provided so that the latter can be located by the user.

The details of the electronic device 30 are not illustrated or explained in detail because it can be, for example, a conventional smartphone. Advantageously, a smartphone with an integrated navigation system, in particular GPS, and with a radio device, for example Bluetooth or W-LAN, is used here.

In a smartphone with an integrated navigation system, a retrievable software program, known as APP, in particular is loaded in the conventional manner, and this is programmed such that it makes it possible to read the signals regarding its location transmitted by the ball 10, to evaluate the signals and to display the effective location of the ball 10' on the display 31.

With this software program, additional functions can be programmed so that, for example, the locations determined for the ball can be retrieved and so the user can track and analyse the locations and flight distances of the ball.

An APP software program known for golf, with which individual stretches of a golf course can be shown on the display, would also be particularly suitable. One could then also correspondingly specify distances as well as the location of the ball, for example the distance from the green and/or from an obstacle or similar.

An identification that can be recognized by the electronic device 30 is assigned to the ball 10 so that the electronic device 30 picks up the ball which belongs to the user. This identification can already be entered in the electronic device 20 within the ball 10 when programming the software. However, this could also be achieved by conveying a signal from the electronic device 30 to the ball 10.

The signal transmission from the transmitter 23 within the ball 10 to the external device takes place wirelessly via a radio connection, in particular Bluetooth or similar. A receiver can also be provided instead of this transmitter 23. The device would then locate the ball by means of the transmitted signals and the signals received from the ball. The received signals could also be reflected back to the device in order to determine the distance.

At least one primary cell integrated into the ball or a re-chargeable battery or an accumulator can be used as the energy source 25. Preferably, this re-chargeable batter or the accumulator can be charged by contact-free power transmission.

Within the framework of the invention the electronic device 20 can also be controlled in different ways. In all cases it must be guaranteed that the electronic device 20 is switched off when the ball is not being used so that energy consumption is minimised. It can be switched on for a short time by a radio signal from the device, for example in order to find the ball 10. Switching on and off could, however, also be brought about by hitting or by impact of the ball itself. If the battery has sufficient capacity it could be switched on for the whole game so that the entire path of the ball from stroke to stroke could be plotted and displayed.

Furthermore, the electronic device 20 with the microelectronics 22, the receiver 21 and the transmitter and/or receiver 23 is embedded in the centre of the plastic core 13 of the ball 10 so that the centre of gravity of the ball is at its centre point and the ball enables a trajectory or rotation during flight as with a ball without any electronics.

Figure 3:
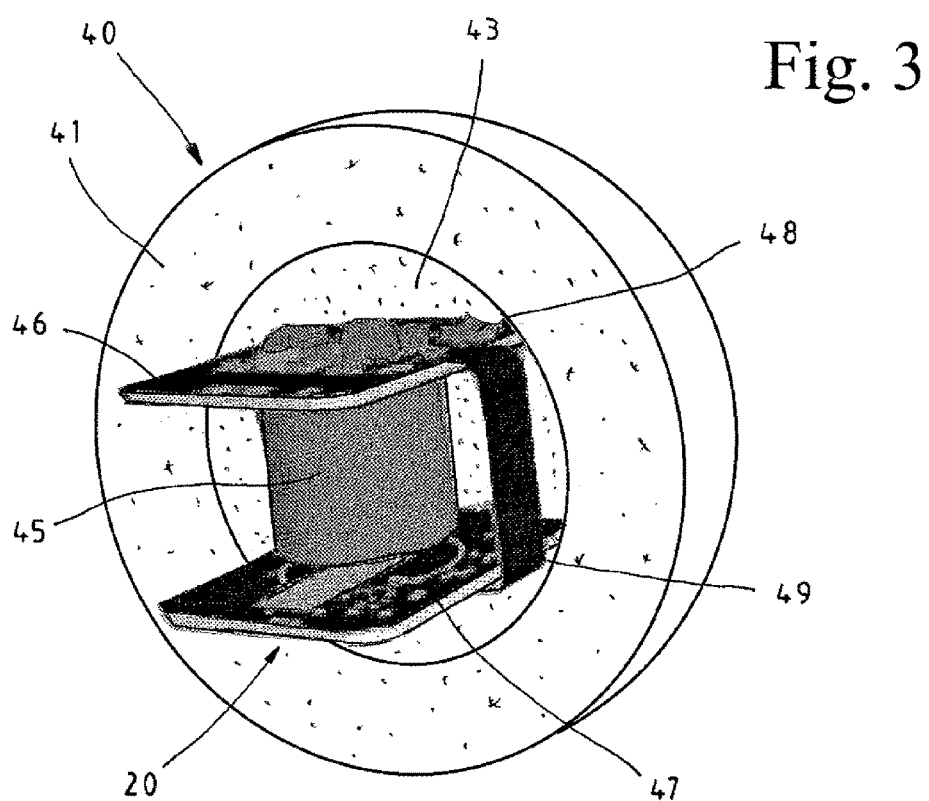
FIG. 3 is a diagrammatic section through a ball according to the invention with an arrangement of the electronic device.

FIG. 3 shows a version of a ball 40 according to the invention, which in itself has the same structure as that of FIG. 1. Therefore, only the differences will explained in the following. There is integrated into the plastic core 43 of the ball 40 provided with a conventional outer casing 41 an electronic device 20 of which a cylindrical battery 45 is illustrated as the energy source, and to either side of the latter a circuit board 46, 47 with integrated electronic components 48. This arrangement is advantageously suitable for the application with a navigation system, such as GPS, in which the signals are transmitted and received via satellite. Both the battery 45 and these circuit boards 46, 47 are advantageously entirely cast in the plastic.

The relatively large battery 45, which makes up almost a third of the height of the ball diameter, makes it possible to locate the position of the ball 40 with GPS, the power energy for sending the signals in each case being low, but this battery must have appropriate dimensions for a sufficient life span of the ball.

The ball can then accordingly be located with the separate electronic device 30 carried by a user, advantageously with a smartphone with an integrated navigation system.

Instead of this battery 45, a button cell which is suitable for a version with a local locating system and not with GPS could also be embedded as an energy source with a significantly smaller height.

The invention is sufficiently demonstrated by the exemplary embodiment explained above. However, it could, needless to say, also be realized by other versions. Thus, for the charging of the batteries in the ball, metallic wires could extend to the surface of the ball, in particular to the inner region of a respective dimple on the outer surface of the ball in which there is generally no or only restricted contact either with the club or upon impact with the ground.

However, the electronic device could also be configured such that in a simple embodiment the vicinity of the ball to the device could be located purely by different frequency tone signals and/or by different intervals between the tones.

The function of the electronic device 20 in the ball can be produced by commercially available components and/or by application-specific components. Needless to say, more or less complex solutions are possible, depending on the life span and the production costs of the ball.

GPS is generally used in the receiver for the positioning of the ball. Basically, however, a different locating system could also be used, for example a system set up locally for the golf course.

The ball can also be located by direction finding, in particular by means of a proprietary radio module. Advantageously, an additional device for the smartphone would therefore be provided with a direction-finding transmitter/ receiver, and this could be designed as a component part of the smartphone case. That is, the additional device may be a separate proprietary radio module which can be connected to the smartphone.

The invention claimed is:

1. A system for locating a ball including a conventional smartphone including an integrated navigation system having a display and configured to communicate with a global positioning system (GPS) and indicate its position on the display, the ball having an assigned identification, the system further comprising:
   an outer casing defining the ball, a core inside the outer casing, an electronic device integrated into the core, and an energy source integrated into the core and which supplies power to the electronic device, the electronic device including at least one receiver that receives signals, microelectronics for evaluating and forwarding the signals received by the at least one receiver, and a communications unit that transmits signals;
   a radio device configured for short-range wireless communication with the electronic device in the ball to enable reception, via the radio device, of signals transmitted by the communications unit of the electronic device in the ball directly from the communications unit of the electronic device in the ball, the microelectronics in the electronic device and the radio device being wirelessly coupled to one another to enable the radio device to switch the electronic device on and off automatically by generating a radio signal; and
   the smartphone further including:
      a microprocessor that recognizes and evaluates the signals received by the radio device to derive location data about the ball, the display displaying actual location of the ball based on the location data derived by the microprocessor; and
      a retrievable software program loaded in the smartphone and that when retrieved by the microprocessor, provides the location data about the ball visually and/or audibly to enable tracking and analysis of location and distances of the ball, and
   wherein the smartphone recognizes the identification assigned to the ball and provides the location data about only the ball having the recognized identification.

2. The system of claim 1, wherein the at least one receiver in the ball is a GPS receiver.

3. The system of claim 1, wherein the core consists of a single plastic part or comprises multiple plastic parts.

4. The system of claim 1, wherein the energy source is in a form of a primary cell.

5. The system of claim 1, wherein the smartphone is configured to provide an acoustic notification relating to the location of the ball.

6. The system of claim 1, wherein the ball is a golf ball.

7. The system of claim 1, wherein the short-range wireless communication the radio device is configured for is BLUETOOTH™ or W-LAN™.

8. The system of claim 1, wherein the electronic device includes a chip including the microelectronics, and the microelectronics comprise electronic components which amplify OPS signals received by the at least one receiver, evaluate the amplified GPS signals received by the at least one receiver and forward the evaluated signals to a transmitter of the communications unit.

9. The system of claim 1, wherein the communications unit comprises a transmitter and at least one antenna, the transmitter and the at least one antenna being integrated into the core.

10. The system of claim 1, wherein the communications unit comprises a transmitter, a communication receiver and at least one antenna, the transmitter, the communication receiver and the at least one antenna being integrated into the core.

11. The system of claim 1, wherein the communications unit comprises a communication receiver and at least one antenna, the communication receiver and the at least one antenna being integrated into the core.

12. The system of claim 1, wherein the electronic device is provided with an integrated circuit by means of which the electronic device is switched on and off automatically.

13. The system of claim 1, wherein the energy source is a re-chargeable battery or an accumulator integrated into the ball.

14. The system of claim 13, wherein the battery or the accumulator are re-chargeable by contact-free power transmission.

15. The system of claim 1, wherein software is provided in the ball for the microelectronics to enable software program sequences within the ball, the software being programmed to include the identification assigned to the ball.

16. The system of claim 1, wherein the communications unit includes a transmitter and the electronic device is embedded in the core of the ball.

17. The system of claim 1, wherein the communications unit includes at least one of a transmitter and a communication receiver, and the electronic device is embedded in a center of the core of the ball so that a center of gravity of the ball is at its center point.

18. The system of claim 1, wherein the smartphone further includes a software program for golf with which individual stretches of a golf course are shown on the display of the integrated navigation system and distances from a green or obstacle are displayed along with location of the ball.

19. The system of claim 1, wherein the ball is located by direction finding.

20. The system of claim 1, further comprising an additional device engageable with the smartphone and which includes a direction-finding transmitter/receiver.

* * * * *

UNITED STATES PATENT AND TRADEMARK OFFICE
CERTIFICATE OF CORRECTION

PATENT NO. : 10,213,646 B2
APPLICATION NO. : 15/038070
DATED : February 26, 2019
INVENTOR(S) : Thomas Sandel, Alex Raimondi and Daniel Rauch Page 1 of 1

It is certified that error appears in the above-identified patent and that said Letters Patent is hereby corrected as shown below:

In the Claims

Claim 8, Column 6, Line 4, after "amplify", change "OPS" to --GPS--.

Signed and Sealed this
Twenty-sixth Day of March, 2019

Andrei Iancu
*Director of the United States Patent and Trademark Office*